United States Patent [19]
Carpinetti

[11] Patent Number: 5,957,634
[45] Date of Patent: Sep. 28, 1999

[54] QUICK CHANGE DRILL EXTENDER SYSTEM

[76] Inventor: David J. Carpinetti, 9 Old Ware Rd., West Brookfield, Mass. 01585

[21] Appl. No.: 08/812,588

[22] Filed: Mar. 7, 1997

[51] Int. Cl.⁶ .......................... B23B 51/12; B23B 31/107
[52] U.S. Cl. ............................ 408/226; 279/75; 279/143; 279/905; 408/239 A
[58] Field of Search ................................ 408/226, 239 R, 408/239 A; 279/75, 143–145, 904, 905

[56] References Cited

U.S. PATENT DOCUMENTS

| | | | |
|---|---|---|---|
| 2,752,965 | 7/1956 | Mackey | 408/226 |
| 3,576,076 | 4/1971 | Weissman | 279/97 |
| 4,184,692 | 1/1980 | Benson et al. | 408/226 |
| 4,514,117 | 4/1985 | Scott | 408/239 R |
| 4,692,073 | 9/1987 | Martindell | 408/239 A |
| 4,818,157 | 4/1989 | Kouvelis | 279/905 |
| 4,995,768 | 2/1991 | Craft | 408/239 A |
| 5,062,749 | 11/1991 | Sheets | 408/226 |
| 5,624,214 | 4/1997 | Carroll | 408/226 |
| 5,660,400 | 8/1997 | Kasmeier et al. | 408/226 |

*Primary Examiner*—Steven C. Bishop
*Attorney, Agent, or Firm*—Thomas A. Kahrl, Esq.

[57] ABSTRACT

A drill extender apparatus having: (1) an rotary drive coupler providing, on one end, threaded engagement to the drive of a conventional electric drill and a polygonal shaped driven tool receptor cavity and locking collet at the other end; and (2) a tool extender, having drive shaft at one end, and a polygonal shaped driven tool receptor cavity and locking collet at the other end for receiving a tool, such a tool would include one of a set of drill bits, each having an extender shaft having a notched polyhedron shaft having multiple positions for drilling/boring deep holes, having multiple grooves adapted to be received by the quick disconnect collet of the tool extender wherein the balls selectively engage a groove for engaging said polygonal shaft and the polygonal shaped shaft is locked in place by the action of the polygonal cavity of said collet.

10 Claims, 15 Drawing Sheets

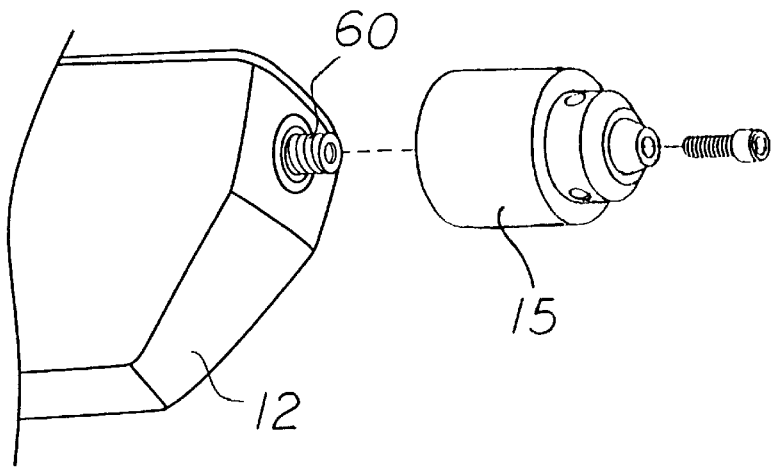
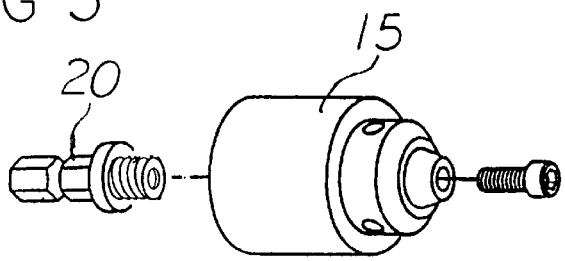
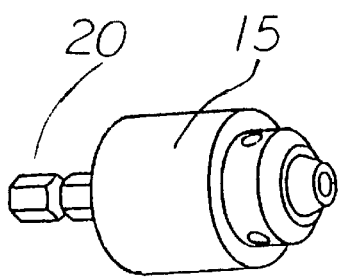
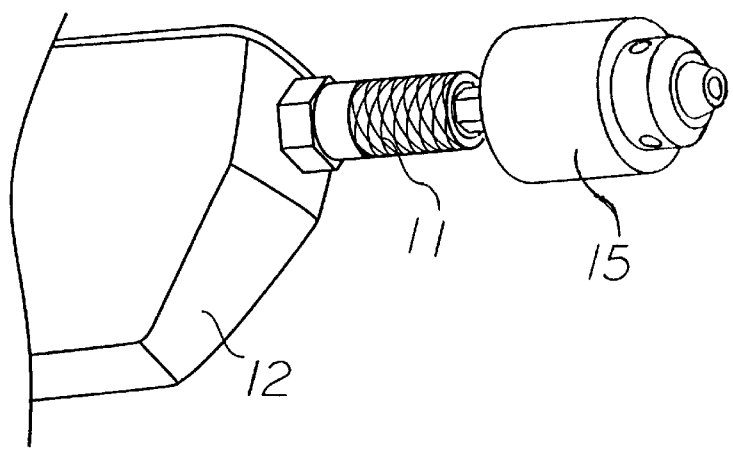

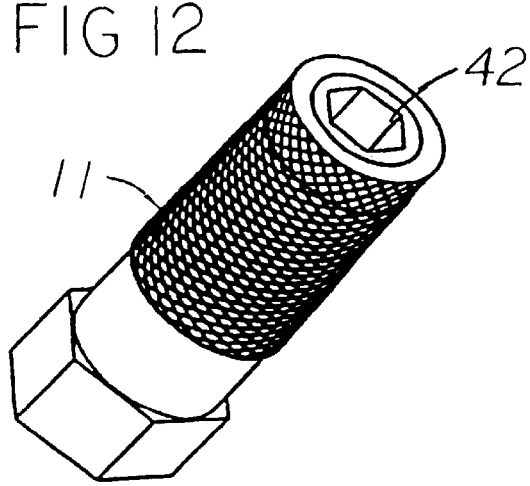
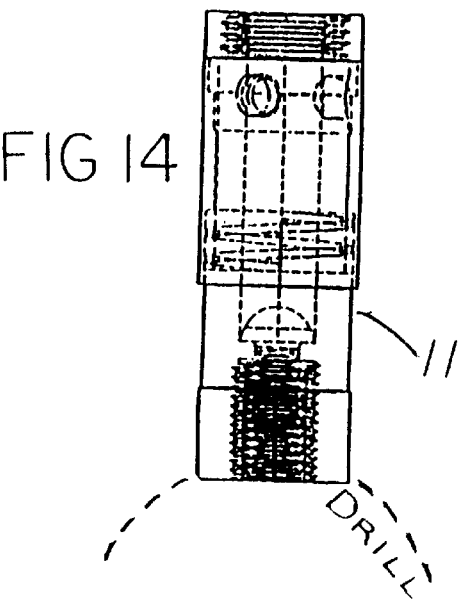
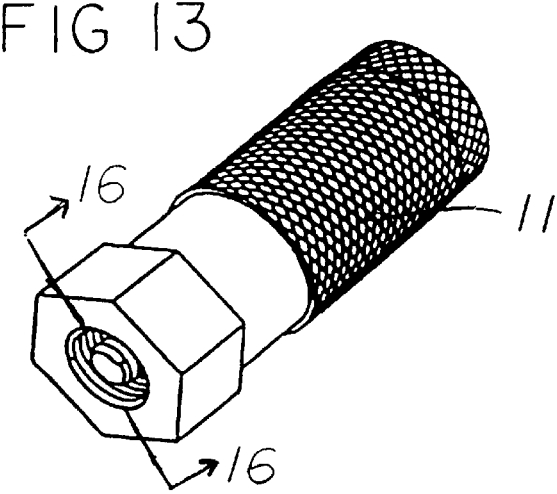
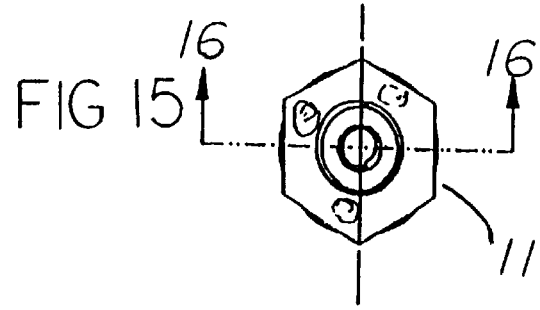
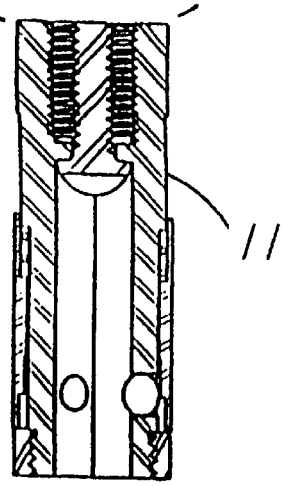

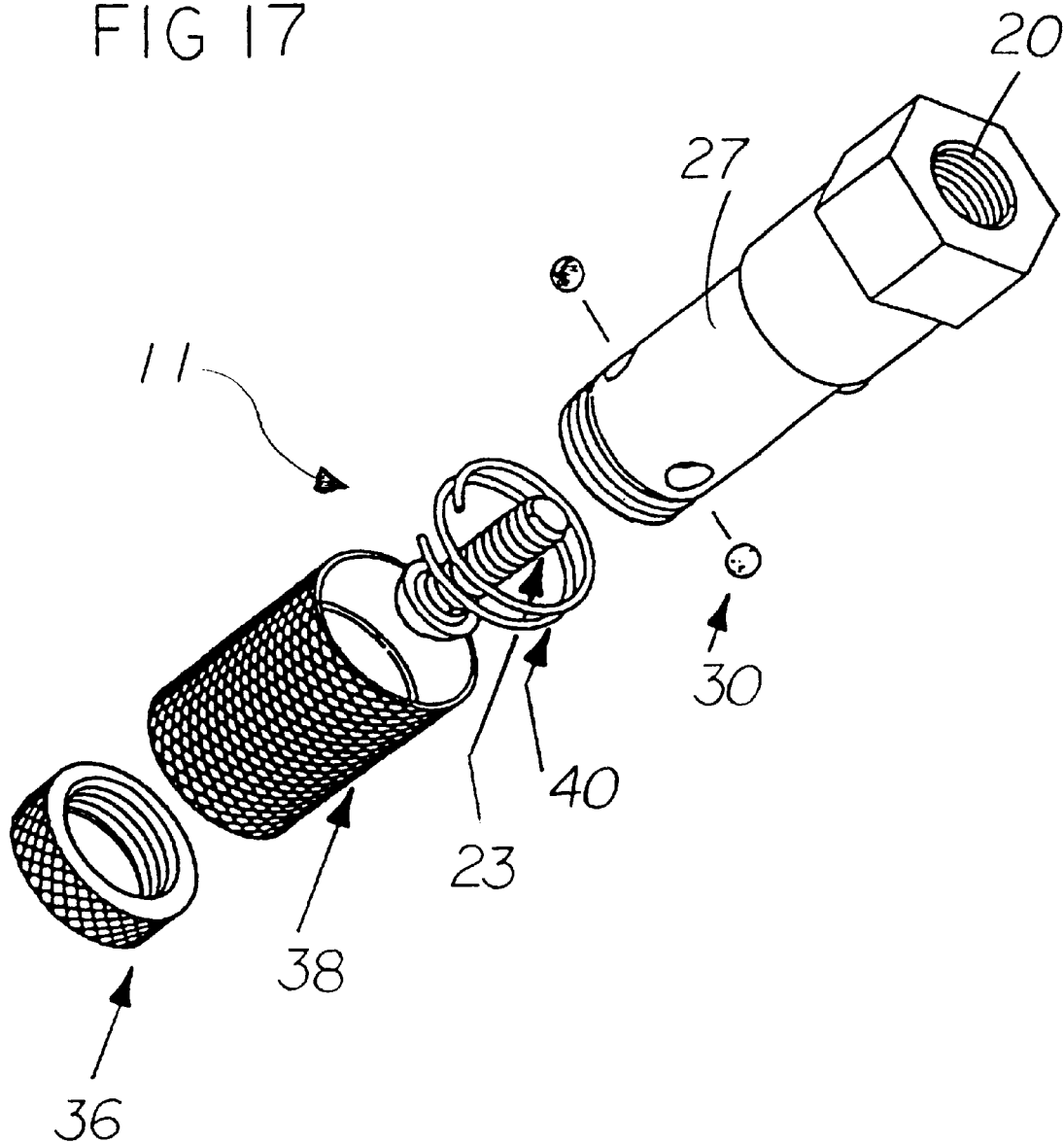

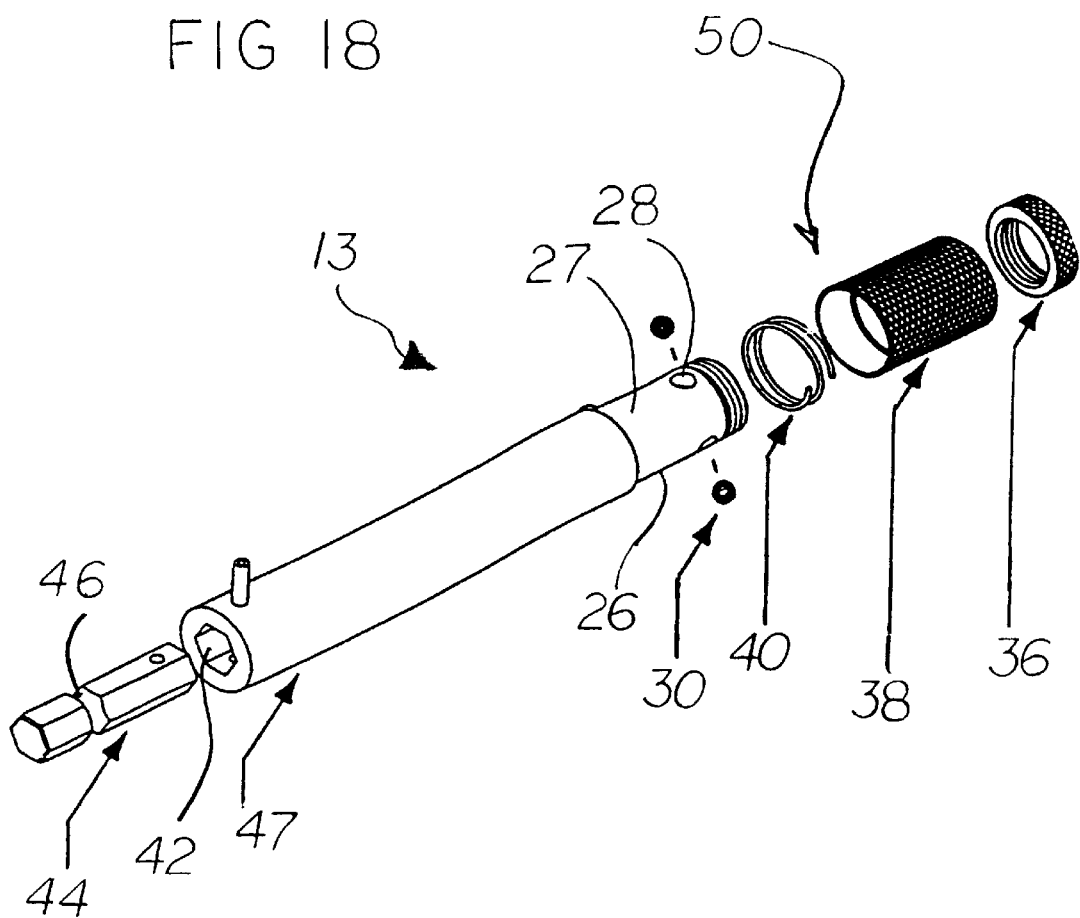

96 94

80

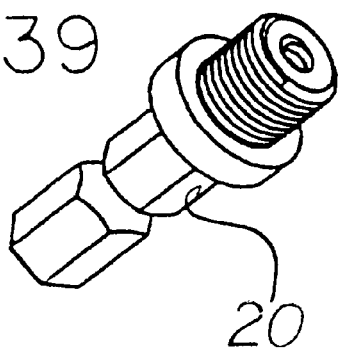
FIG 39
20
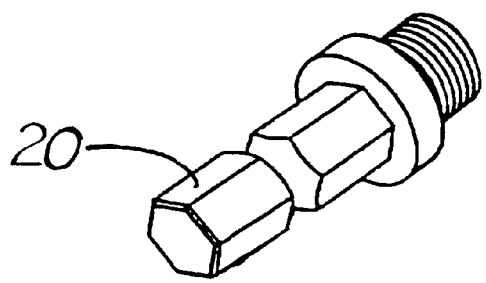
FIG 40  20
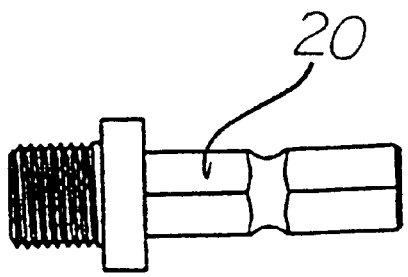
20
FIG 41
FIG 42
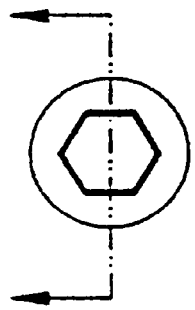

QUICK CHANGE DRILL EXTENDER SYSTEM

BACKGROUND OF THE INVENTION

1. Field of the Invention

The present invention is directed to a keyless drill extender apparatus having a rotary drive coupler in combination with a tool extender and associated tools. Such coupler and extender each include a polyhedron receptor and such extender and tools each have a notched polyhedron shaft. Such tools consist of a set of drill bits each having an extendible shaft for drilling/boring deep holes.

2. Background Art

The prior art indicates a long felt need for a drill chuck having a quick tool change feature. It is apparent that sustained attempts have been made to provide ease of change of tool bits for a drill chuck, including use of a plurality of ball(s), each ball adapted to releasably engage a dimple formed on a drill bit shank.

Applicant is aware of U.S. patents which show use of chucks having ball(s) to engage/disengage a drill bit shank's dimples, including the following;

U.S. Pat. No. 4,184,692 to Benson et al. shows a quick-change drill chuck adapted for positioning ball elements within dimples circumferentially disposed about the central axis of the adapter portion of a tool such as a drill, to drive the drill. A first quick-change drill chuck utilizes an axially spring-biased collar, while a further quick-change drill chuck incorporates a rotary spring-biased collar for manipulating the ball elements into and out of the dimples.

U.S. Pat. No. 4,692,073 to Martindell shows a handle adapter and chuck apparatus for a power bit including a quick release chuck having a spindle with a longitudinally extending bore in the spindle adapted to receive the shank of the power bit. A radially extending bore extends though the spindle and communicates with the bore. A ball is disposed in the bore and contacts a portion of the shank of the power bit disposed in the bore. A spring biased sleeve is disposed about the spindle and includes a tapered bore which bears against the ball to bias the ball against the shank of the tool.

U.S. Pat. No. 4,818,157 to KOUVELIS shows a quick change adapter for power drills consisting of a shaft that can be inserted in a chuck of the drill. The shaft is coupled to and coaxial with a tool holder that includes means for retaining a tool and means for driving the tool.

Despite the teachings of the prior art, which indicate use of a hexagonal ended drill bit and ball(s) to engage/disengage with the drill bit shank's dimples and with a drill chuck, there has not been a device for a keyless, extendable drill apparatus in combination with a quick change feature for drilling deep holes. The present invention employs the advantageous characteristics of a keyless extender device in combination with a keyless rotary drive coupler. The prior art does not present such an efficient and effective apparatus of providing a quick change for successively elongated drills.

Accordingly, it is desirable to provide for a new and improved drill drive extender employing an quick change drive coupler, used in lieu of a drill chuck, and employed in tandem with a quick change extender tool, which overcomes at least some of the disadvantages of prior art and is lightweight and economical. The present invention permits this by employing a novel rotary drive coupler which piggybacks with a tool extender and by the application of its inherent parts.

SUMMARY OF THE INVENTION

The present invention is directed to a keyless drill extender apparatus for an electric drill having a quick change rotary drive coupler. In particular it is directed to a drill extender in combination with a tool extender and associated tools. Said coupler is keyless and typically replaces a standard drill chuck, typically a Jacobs® chuck with key, for articulating between an open position and a closed, tool engaged position. Such coupler and extender each include a polyhedron receptor and such tools include a set of drill bits, each having an extendable polyhedron shaft having multiple positions for drilling/boring deep holes configured to telescopically retract within the body of said extender.

In the present invention a quick change adapter for use with power drills consists of a rotary drive coupler that can be used to replace a chuck of the drill. The adapter is coupled to, and coaxial with, a tool extender that includes means for extending a tool, as well as retaining said tool and means for driving the tool.

In particular, the present invention is directed to the inventive combination of a drill extender apparatus having: (1) a rotary drive coupler providing, on one end, threaded engagement to the drive shaft of a conventional electric drill and, at the other end, a polygonal shaped driven tool receptor cavity with locking collet; and (2) a tool extender, having drive shaft at one end and a polygonal shaped, driven tool receptor cavity and locking collet at the other end, for receiving a drill bit.

In the specific arrangement of the invention, the hollow end portions (receptor cavities) of the rotary drive coupler and the extender are designed to receive hexagonal shaped shafts and engage those at transverse grooves in the shafts. The inner surfaces of both pieces include multiple sockets, each adapted to retain a ball, movable between an inner locking position and an outer release position associated with grooves provided on the stub shaft.

As is shown in the present invention, the rotary drive coupler and tool extender members are configured to be joined together; the tool extender having a stub shaft extension at one end which is received into the receptor cavity of the rotary drive coupler, and a second receptor cavity in the other end of the tool extender which receives a drill bit shaft and acts as a tool holder. The rotary drive coupler and tool extender receptor cavities and stub shafts are identical and the tool extender piggybacks axially into the rotary drive coupler. The extender has a knurled ring and a set of balls, residing in a tubular female distal end of the extender, which engage a notched groove in the drill bit shank.

Accordingly, the object and purpose of the present invention is to provide a keyless quick change drill extender apparatus.

Another object of the present invention is to provide for a successively extendible tool for drilling successively deeper holes.

Yet another object of the present invention is to provide for a quick change coupler adapted to cooperate with a plurality of tools and tool extenders.

A further object of the present invention is to provide for a keyless drive coupler.

Yet another object of the present invention is to provide for a keyless tool extender.

Another object of the present invention is to provide for a drill having a multiple extendable shaft for use with a tool extender, wherein said multiple extendable shaft telescopically retracts within the body of said tool extender.

The invention will be described for the purposes of illustration only in connection with certain embodiments. However, it is recognized that those persons skilled in the art may make various changes, modifications, improvements and additions on the illustrated embodiments, all without departing from the spirit and scope of the invention.

BRIEF DESCRIPTION OF THE DRAWINGS

The accompanying drawings, which are incorporated into and form a part of the specification, illustrate several embodiments of the present invention and together with the description serve to explain the principals of the invention. The drawings are only for the purpose of illustrating a preferred embodiment of the invention and are not construed as limiting the invention.

FIG. 4 is a partially exploded perspective view of a drill and a conventional chuck unthreaded from the drill.

FIG. 5 is a partially exploded perspective view of the converted conventional chuck of FIG. 4 and a short chuck shaft with groove of the present invention of FIG. 1.

FIG. 6 is a perspective view of the quick change chuck that was previously removed in FIG. 4, with the short chuck shaft of the present invention of FIG. 1 installed.

FIG. 7 shows a conventional drill chuck, now a quick change chuck with short chuck shaft inserted into the quick change adapter of the present invention of FIG. 1 for use with a conventional drill.

FIG. 12 is a perspective view of the rotary drive coupler of the invention of FIG. 1 shown from the coupling end showing a hexagonal receptor cavity.

FIG. 13 is a perspective view of the rotary drive coupler shown in FIG. 12 shown from the drive end with the sleeve moved from the tool engaged position to the tool release position.

FIG. 14 is a side view of the rotary drive coupler shown in FIG. 12 with internal parts and power drill shown in phantom.

FIG. 15 is an end view from the drive end of the rotary drive coupler shown in FIG. 12.

FIG. 16 is a sectional view of the rotary drive coupler of FIG. 12 taken along lines 16—16 shown in FIG. 13.

FIG. 17 is an exploded perspective view the rotary drive coupler of FIG. 12.

FIG. 18 is an exploded perspective view of the tool extender of the invention of FIG. 1.

FIG. 39 is an isometric view of drill chuck attachment showing grooved hexagonal shaft taken from the threaded end.

FIG. 40 is an isometric view of drill chuck attachment of FIG. 39 taken from the shaft end.

FIG. 41 is a side view of FIG. 39.

FIG. 42 is an end view of FIG. 41.

DETAILED DESCRIPTION OF THE PREFERRED EMBODIMENT

Figure 1:
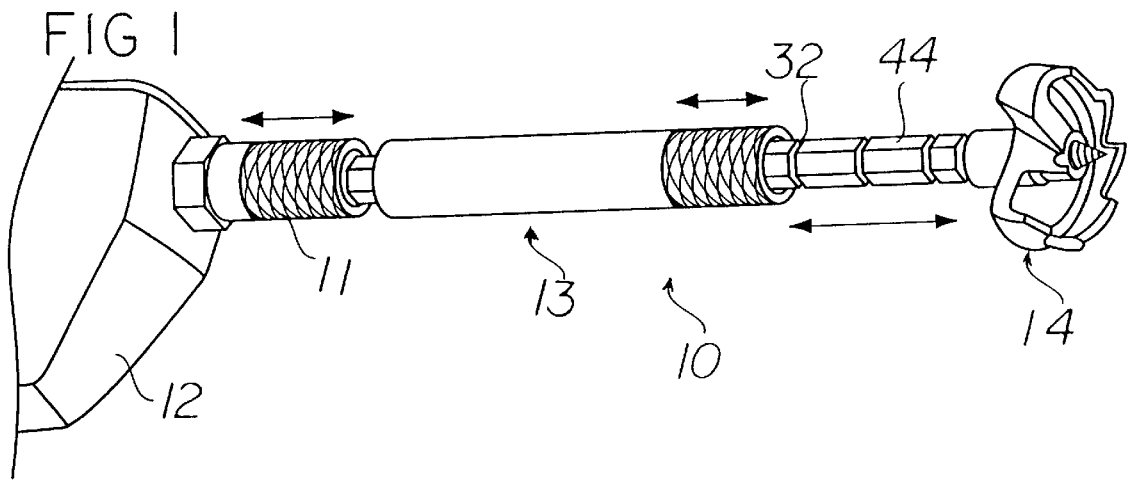
FIG. 1 is a perspective view of the quick change drill extender apparatus of the present invention shown with a drill extender apparatus fully assembled; including a coupler, a tool extender, and a tool having a telescoping shaft.

Referring to the drawings, there is shown in FIGS. 1–34 an extender apparatus 10 for use with a rotary drive 12, such as a conventional electric drill, and a tool 14 being one of a set 16 of drill bits. As is shown in FIGS. 1–2, said extender apparatus consists of a keyless drive coupler 11 adapted to associate with a keyless tool extender 13.

Figure 2:
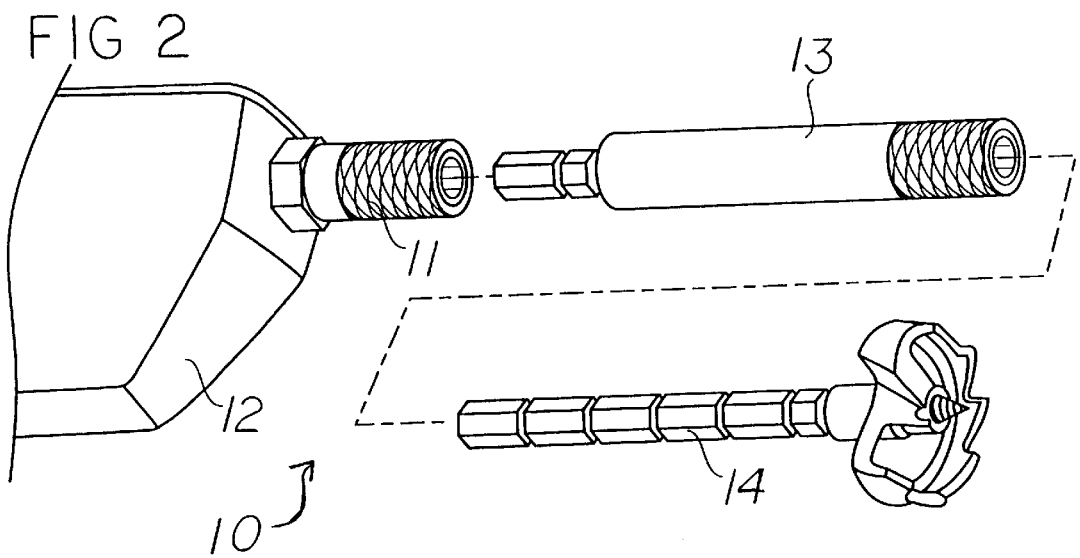
FIG. 2 illustrates the quick change drill extender of FIG. 1 being inserted in the quick change adapter.
Figure 10A:
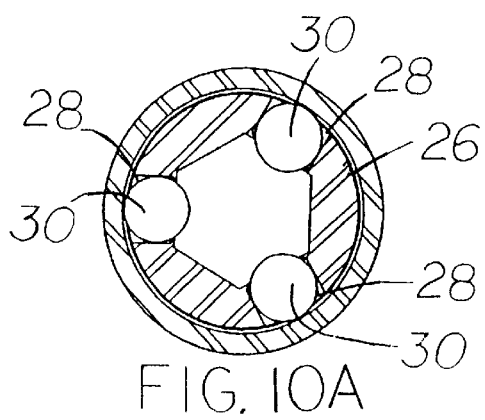
FIG. 10a is a horizontal cross section of the coupler and shank member of a tool shown in the tool engaged position of the present invention of FIG. 1 along lines 10—10.
Figure 11A:
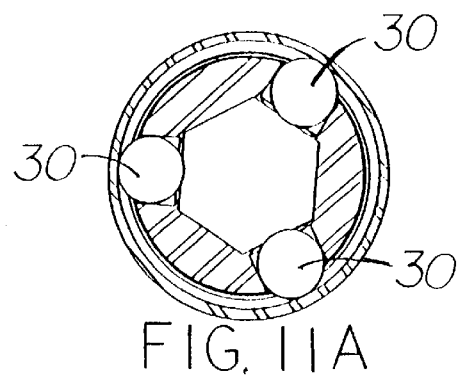
FIG. 11a is a horizontal cross section similar to FIG. 10a of the coupler and shank member of a tool of FIG. 10a shown in the tool release position along lines 11—11.
Figure 10B:
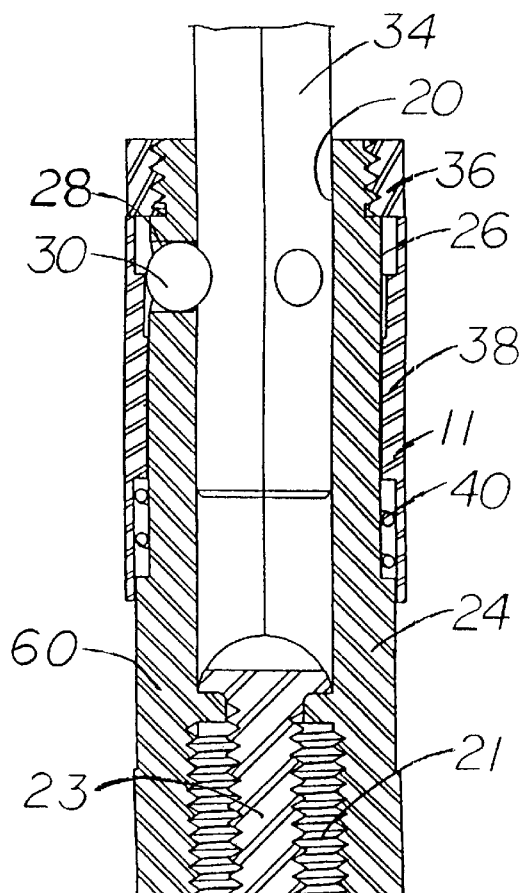
FIG. 10b is a vertical cross section of the coupler and shank member of a tool shown in the tool engaged position of the present invention of FIG. 1 along lines 10—10.
Figure 11B:
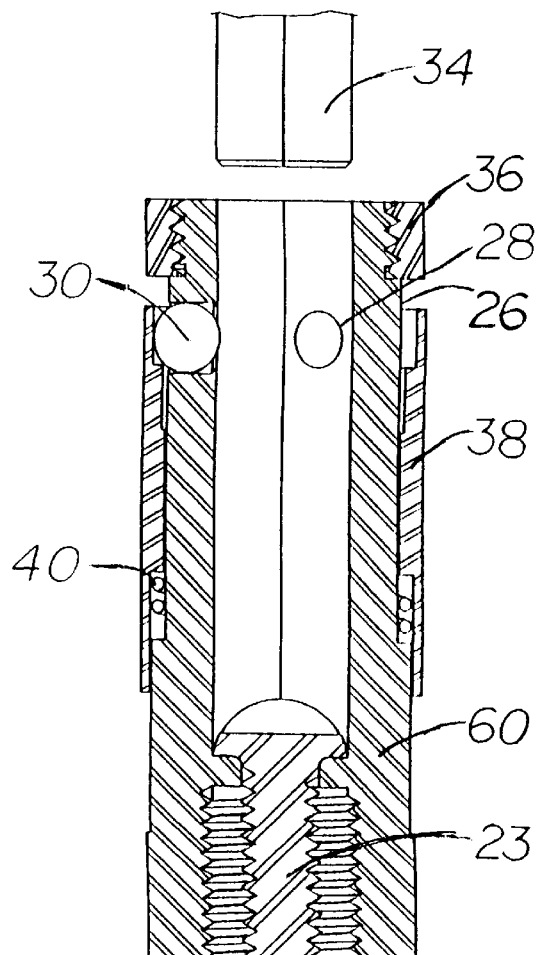
FIG. 11b is a cross section similar to FIG. 10b of the coupler and shank member of a tool of FIG. 10b shown in the tool release position along lines 11—11.

As is shown in FIG. 1, said tool is typically configured for drilling a hole (not shown) of considerable depth extending into a work piece. The rotary drive 12 provides torque for rotating a selected tool 14. The drive coupler 11 is employed to replace a conventional key-operated drill chuck 15, typically a Jacobs® chuck, shown in FIG. 4. Referring to FIGS. 10b and 11b, said coupler includes a first and second end including a threaded adapter 21 at the first end for engaging rotary drive 12. Collet 20 is positioned at the other end and consists of a keyless, quick acting coupler 11 having a cylindrical body 24 having a journal surface 26 including a plurality of sockets 28. Each of said sockets are adapted to retain a ball 30 moveable between an inner locking position and an outer release position as is shown in FIGS. 10a, 10b, 11a and 11b. Collet 20 is adapted to associate with one or more recess elements 32 provided on an associated extendible shaft member 34. A threaded retaining ring 36 is positioned at an end for retaining sleeve 38 in place on body 27 wherein said sleeve is slideably mounted on journal surface 26 in combination with a spring 40 for urging said sleeve between a retracted disconnect position and a connect position, as is shown in FIGS. 10b and 11b.

Referring to FIG. 12, a receptor cavity 42 is positioned at the end of drive coupler 11 and is formed in a polygonal shape to receive a polygonal shank 34 for interconnecting the drive coupler 11 with a plurality of components each having polygonal shanks, each tool including at least one recess element, such as a tool 14 from a set of tools, or a tool extender 13.

Referring to FIG. 18, tool extender 13 comprises a keyless tool extender having a tubular body 47 having a first end and second end, said tool extender typically is employed to mount a tool 14 on drive 12 by engaging drive coupler 11, see FIG. 1. Said tool extender comprises a polygonal shaft 44 mounted at one end, having at least one recess element 46 adapted to be received by the coupler 11 at the opposite end from a threaded adapter 48, wherein each of balls 30 engage a recess element 32 for engaging shaft 34 for keyless longitudinal locking of the tool 14. Furthermore, the polygonal shaped shaft 44 is locked in place longitudinally by the action of the cooperating polygonal cavity 42.

As is shown in FIG. 18, quick disconnect coupler 50 at the second end comprises a cylindrical body 27 having a journal surface 26 including a plurality of sockets 28, each of said sockets adapted to retain said ball 30. Said coupler is moveable between an inner locking position and an outer release position adapted to associate with each of one or more recess elements 32 on a polygonal shaft member 44, see FIG. 1. As is shown in FIG. 18, a threaded retaining ring 36 is positioned at the other end for retaining sleeve 38 in place on journal 26 Sleeve 38 is slideably mounted on said journal surface in association with a spring 40 for moving said sleeve between a retracted disconnect position and a connect position. As is shown in FIG. 18, receptor cavity 42 is formed in a polygonal shape to receive a polygonal shaft 44 for interconnecting tool extender 13 with a plurality of components, such as tool bits 14 of varying length for drilling holes of varying depths.

Figure 23:
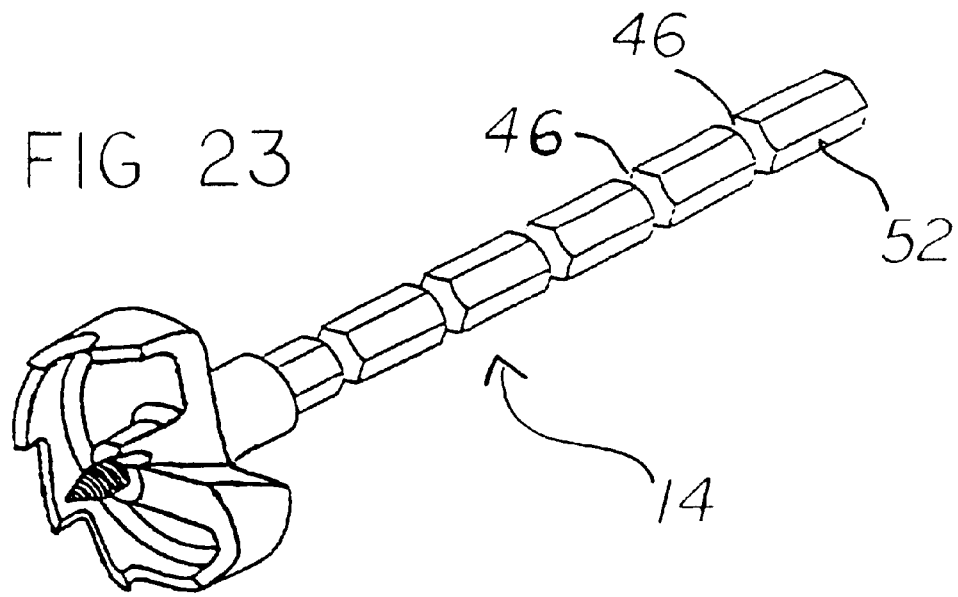
FIG. 23 is a perspective view of the tool of the invention of FIG. 1 having multiple notches on a hexagonal shaft.
Figure 24:
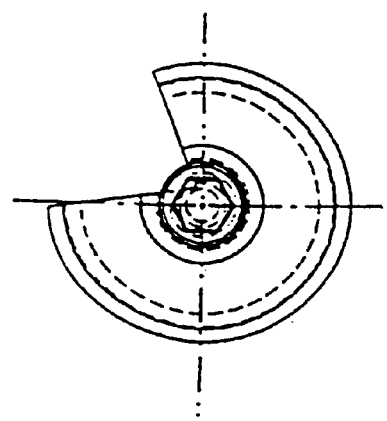
FIG. 24 is an end view partially in section of FIG. 23.
Figure 25:
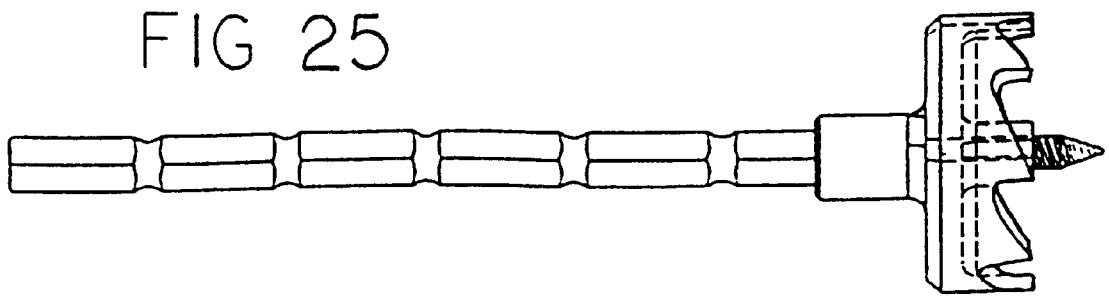
FIG. 25 is a side view of FIG. 23.
Figure 26:
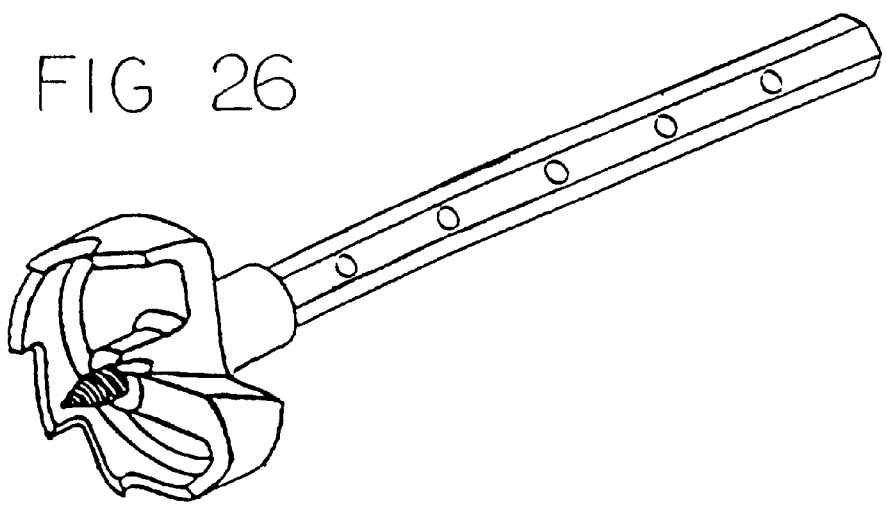
FIG. 26 is a perspective view of the tool of the invention of FIG. 1 having multiple dimples on a hexagonal shaft.
Figure 27:
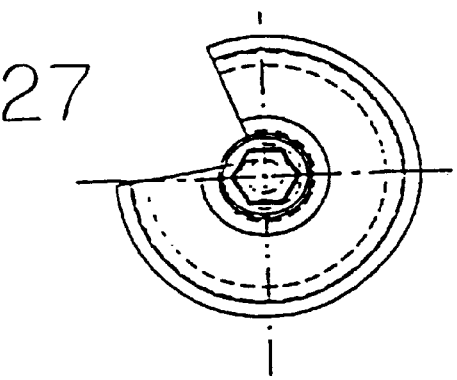
FIG. 27 is an end view partially in section of FIG. 26.
Figure 28:
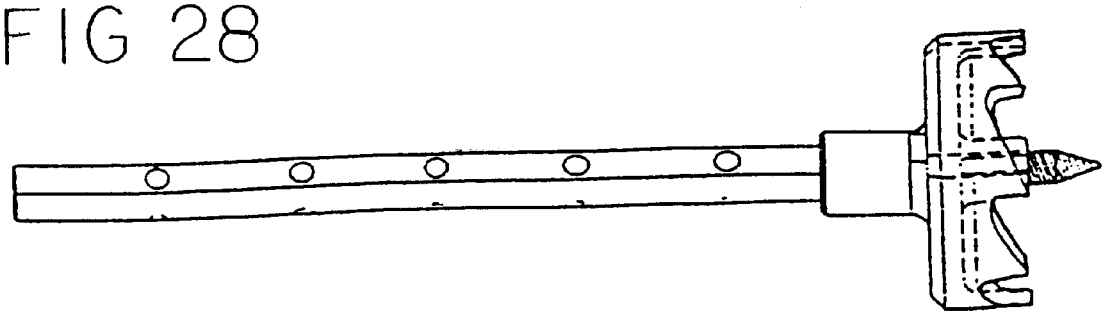
FIG. 28 is a side view of FIG. 26.
Figure 29:
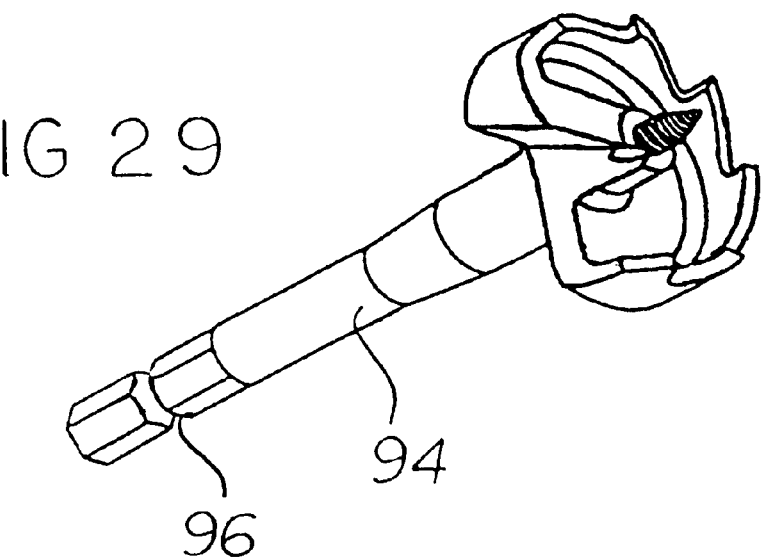
FIG. 29 is a perspective view of the tool of the invention of FIG. 1 having a reinforced shaft with groove on a hexagonal shaft.
Figure 30:
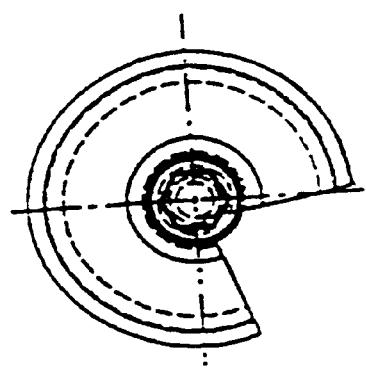
FIG. 30 is an end view partially in section of FIG. 29.
Figure 31:
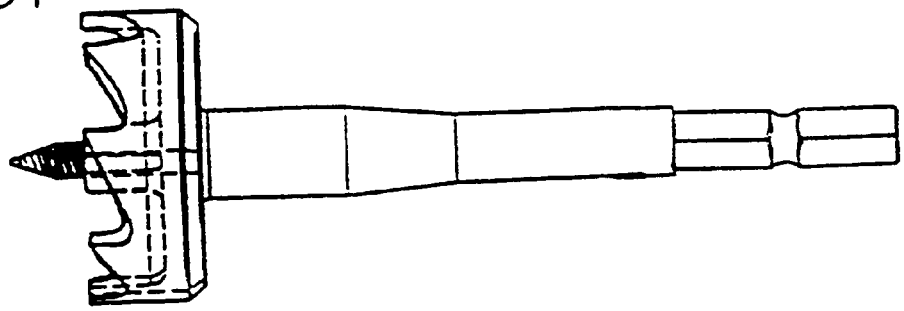
FIG. 31 is a side view of FIG. 29.

As is shown in FIG. 23, said tool 14 comprises a polygonal shaft 52 having at least five recess elements 46 adapted to be received by quick disconnect collet 20 of said tool extender, wherein balls 30 selectively engage recess elements 32 for engaging said polygonal shaft 44. Connection of the tool is accomplished by insertion of a drill bit having a polygonal shaft with at least five recess elements adapted to be received by the quick disconnect collet of the tool extender. Connection is made whereby said balls selectively engage a recess element for engaging said polygonal shaft and the polygonal shaped shaft is locked in place by the action of the polygonal cavity of said collet. Each component includes a shaft, typically polygonal, configured to be received by a quick disconnect collet. The set of drill bits each have a notched polyhedron shaft having multiple positions for drilling/boring deep holes in association with the drill extender apparatus, wherein each component includes polygonal shaft, typically hexagonal, configured to be received by a quick disconnect collet member.

In the preferred embodiment, referring to FIG. 1, there is shown a hand held power drill 12 having a motor 56 and a coaxial shaft 58 having a threaded end (left hand) 60 shown with an extender apparatus 10 fully assembled, including a coupler 11 having a spring biased sleeve 38 slideably mounted for movement between a tool-engaged position and a tool-release position, a tool extender 13 also having a spring biased sleeve 38 slideably mounted for movement between a tool-engaged position and a tool-release position, and a tool 14 having a telescoping shaft 44. FIG. 2 illustrates the quick change drill extender apparatus being inserted in the quick change adapter as well as inserting the telescoping quick change tool 14. There is shown in FIG. 4 a partially exploded perspective view of a drill and a conventional chuck; and in FIG. 5 a partially exploded perspective view of the conventional chuck of FIG. 4 and a short chuck shaft with groove. Referring to FIG. 6 there is shown a perspective view of the quick change chuck that was previously removed in FIG. 4, with the short chuck shaft installed. Referring to FIG. 7 there is shown a conventional drill chuck, now a quick change chuck with short chuck shaft inserted into the quick change adapter for use with conventional drill.

Figure 8:
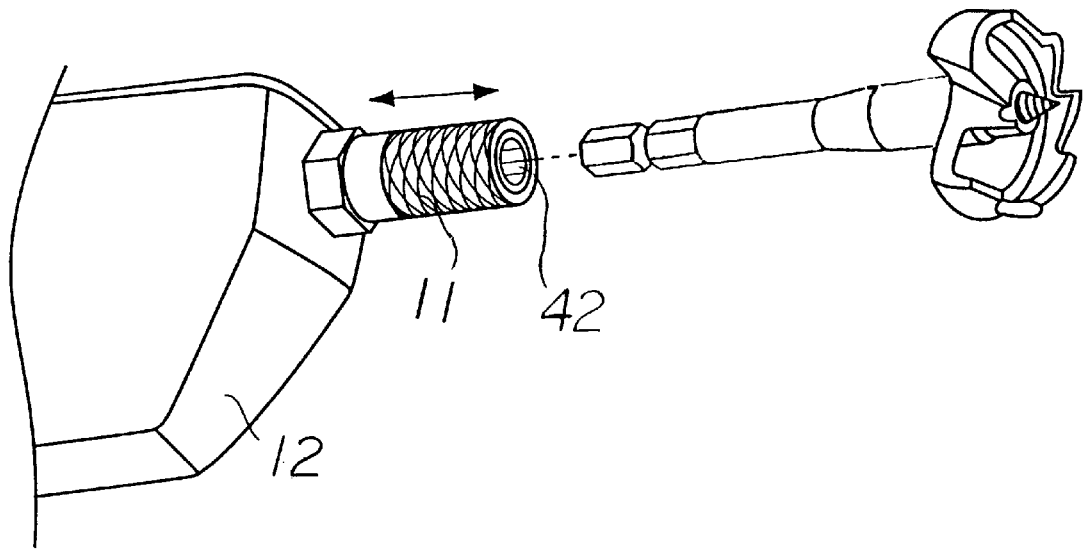
FIG. 8 is a partially exploded perspective view of a drill and the quick change adapter of the present invention of FIG. 1, without tool extender.

Referring to FIG. 8, there is shown a partially exploded perspective view of a drill 12, and the quick change adapter consisting of a rotary drive coupler and a quick change tool consisting of a drill bit 14 with telescoping shaft 44, wherein installation into the quick change adapter is accomplished by simply pulling back slightly on the knurled collar of sleeve 38, inserting the drill bit 14, and releasing said collar to the original position. This will lock the bit 14 firmly in place and prevent said drill bit or any other accessory from pulling out of the coupler 11 while drilling a hole or retracting from a drill hole. There is shown in FIGS. 10a and 10b a cross section of the coupler and shank member, with a tool shown in the tool engaged position also as shown in FIG. 1. In FIGS. 11a & b there is shown a cross section similar to FIG. 10 of the coupler and shank of a tool of FIG. 10, shown in the tool release position.

There is further shown in FIGS. 12–16 the rotary drive coupler 11 shown from the coupling end, showing a hexagonal receptor cavity. In FIG. 13 is shown a perspective view of the rotary drive coupler shown in FIG. 12 shown from the drive end of the invention of FIG. 1 with the sleeve 38 moved from the tool engaged position of FIG. 12 to the tool release position. There is shown in FIG. 14 a side view of the rotary drive coupler shown in FIG. 10 with internal parts and power drill shown in phantom; and in FIG. 15 is an end view from the drive end of the rotary drive coupler shown in FIG. 12. Referring to FIG. 16 there is shown a sectional view of the rotary drive coupler of FIG. 12 taken along lines 16—16 shown in FIG. 13. FIG. 17 is an exploded perspective view the rotary drive coupler of FIG. 12 showing each part.

Figure 19:
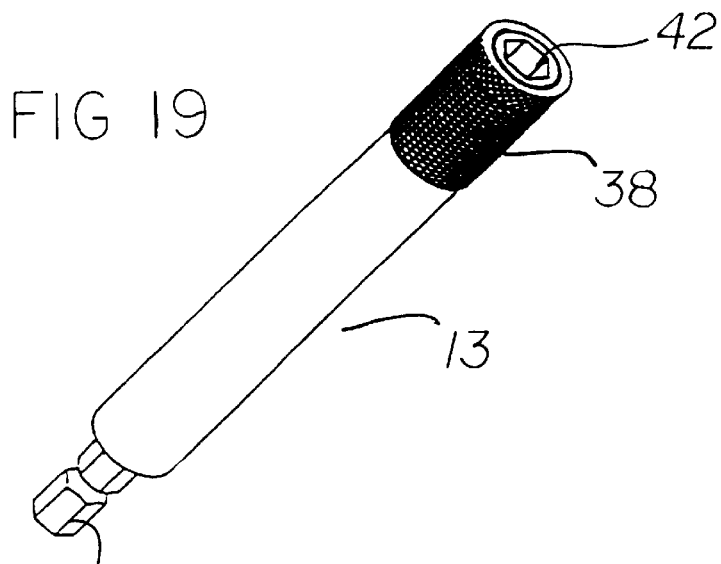
FIG. 19 is a perspective view of the tool extender of FIG. 18 shown from the coupling end, showing a hexagonal cavity.
Figure 20:
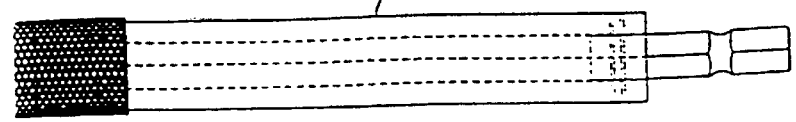
FIG. 20 is a side view of the tool extender shown in FIG. 18 with internal parts shown in phantom.
Figure 21:
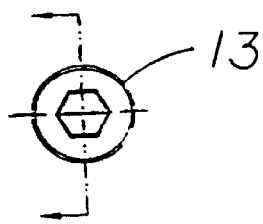
FIG. 21 is an end view of the tool extender shown in FIG. 18.
Figure 22:
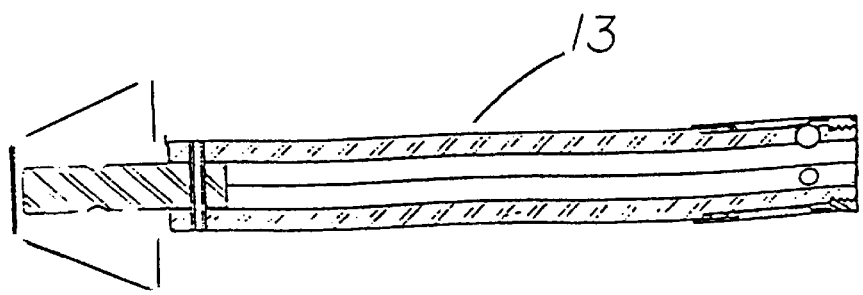
FIG. 22 is a sectional view of the tool extender shown in FIG. 18 with the rotary drive coupler of FIG. 14 shown in phantom.

There is shown in FIG. 18 an exploded view of the tool extender. In FIG. 19 the tool extender is shown from the coupling end, showing a hexagonal cavity; and FIG. 20 is a side view of the tool extender shown in FIG. 18 with internal parts shown in phantom. There is shown in FIG. 23 a perspective view of the tool of the invention of FIG. 1 having multiple notches on a hexagonal shaft.

Figure 35:
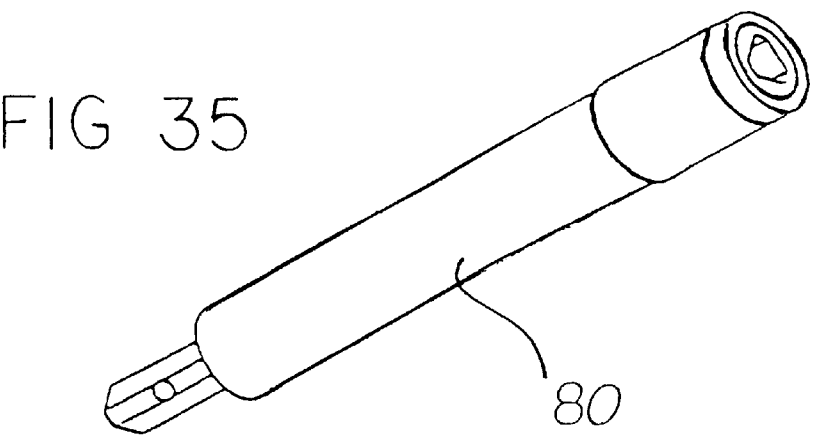
FIG. 35 is a perspective view of an alternate embodiment of the rotary drive coupler shown from the coupling end, shown with a triangular cavity.
Figure 36:
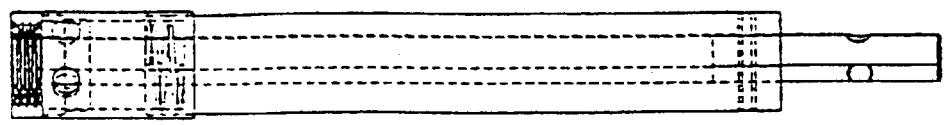
FIG. 36 is a side view of FIG. 35 with internal parts shown in phantom.
Figure 37:
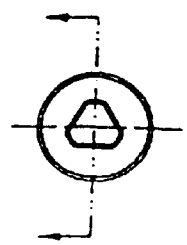
FIG. 37 is an end view of FIG. 35.
Figure 38:
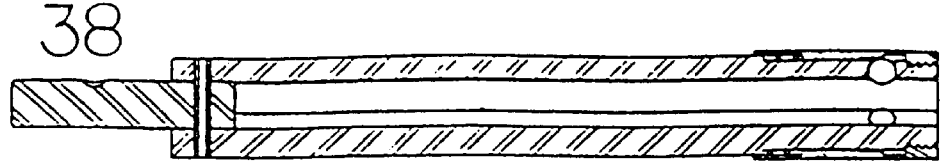
FIG. 38 is a sectional view of FIG. 35.
Figure 43:
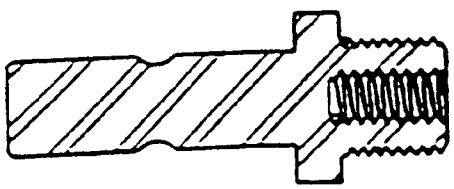
FIG. 43 is a sectional view of FIG. 41 taken along lines 42–43.
Figure 44:
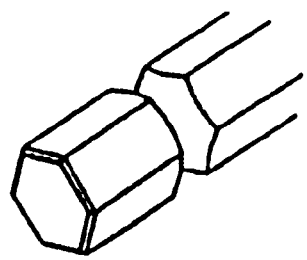
FIG. 44 is a isometric view of a grooved hexagonal shaft.
Figure 45:
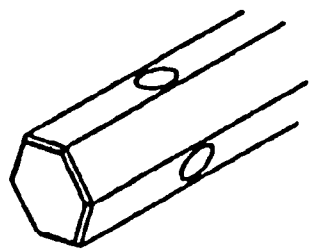
FIG. 45 is a isometric view of a dimpled hexagonal shaft.
Figure 46:
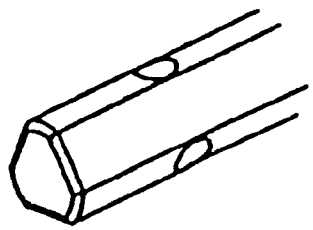
FIG. 46 is a isometric view of a dimpled triangular shaft.

Alternate embodiments of the present invention are shown in FIG. 35, which is a perspective view of an alternate embodiment of a rotary drive coupler 80 shown from the coupling end, shown with a triangular cavity 82. In FIG. 36 there is shown a perspective view of an alternate embodiment of the tool extender shown from the coupling end, shown with a triangular cavity of the invention of FIG. 35. Also in FIG. 36 there is shown a perspective view of said alternate embodiment showing a three sided receptor cavity and using three dimples on male end of shaft to receive locking balls. (Knurling on retaining collar and slide collar not shown).

Figure 32:
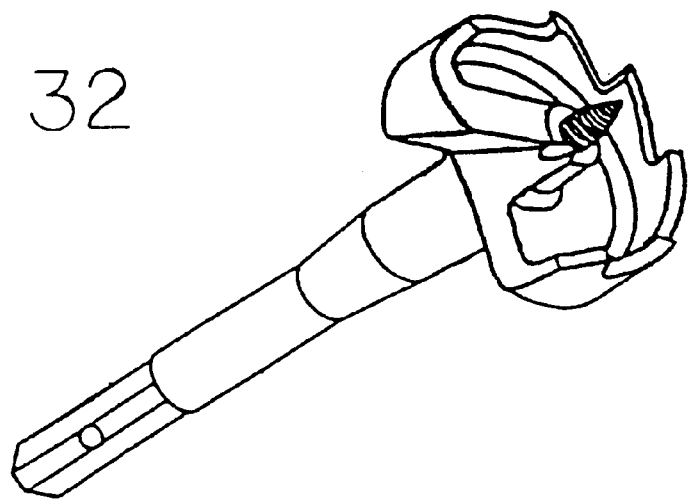
FIG. 32 is a perspective view of the tool of the invention of FIG. 1 having a reinforced shaft with dimple on a hexagonal shaft.
Figure 33:
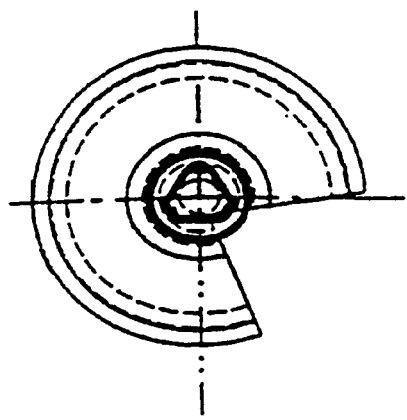
FIG. 33 is an end view partially in section of FIG. 32.
Figure 34:
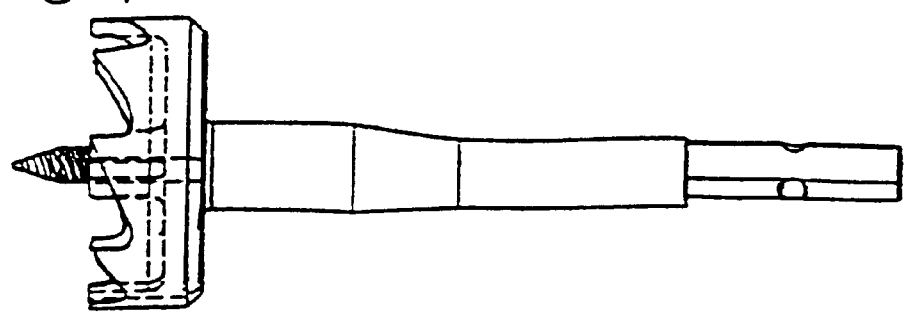
FIG. 34 is a side view of FIG. 32.

Furthermore, FIG. 32 is a perspective view of yet another alternate embodiment of the invention having a reinforced shaft 94 and single groove 96 on a triangular shaft. Any shaft style can be used as long as the receptor cavity matches the shaft and the dimples or the groove line up with the locking balls.

Referring to FIG. 18 is an exploded view of the quick change tool extender showing the various parts as listed below:
 a. Hexagonal shaft end inserts into female receptor cavity of the tool extender.
 b. Main body of the quick change adapter extension (Hexagonal shaft illustrated).
 c. Locking balls. (Three required).
 d. Sliding collar return spring.

Figure 3:
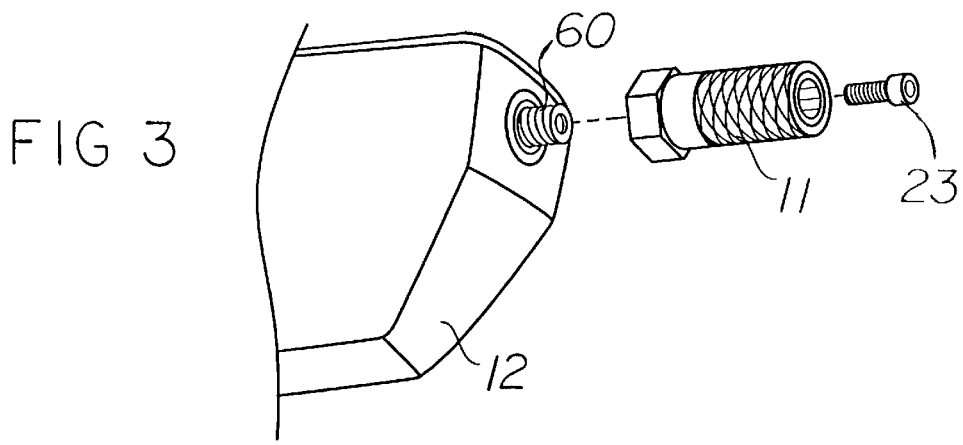
FIG. 3 is a partially exploded perspective view of a drill and the quick change adapter of FIG. 1 shown with a hexagonal cavity.

Installation Procedure:

In the preferred embodiment the apparatus is assembled in the following manner; As is shown in FIG. 1, first remove existing drill chuck from any ordinary ½" drill by opening chuck jaws wide and removing the left hand thread allen screw from the center of the chuck. Unscrew the entire drill chuck from the threaded shaft. Next as is shown in FIG. 2 install the quick change drill chuck in exactly the opposite manner as described in FIG. 1. Next, as is shown in FIG. 3, install the short chuck shaft into the drill chuck that was previously removed in FIG. 1. FIG. 4 displays the completed quick change drill chuck assembly whereas FIG. 5 shows a conventional drill chuck inserted into the quick change adapter for use with conventional drill.

Referring to FIG. 6, installation of any size quick change drill bit into the quick change adapter is accomplished by simply pulling back slightly on the knurled collar, inserting the drill bit, and releasing the collar to the original position. This will lock the bit firmly in place and prevent the drill bit or any other accessory from pulling out of the chuck while drilling a hole or retracting from a drill hole.

Figure 9:
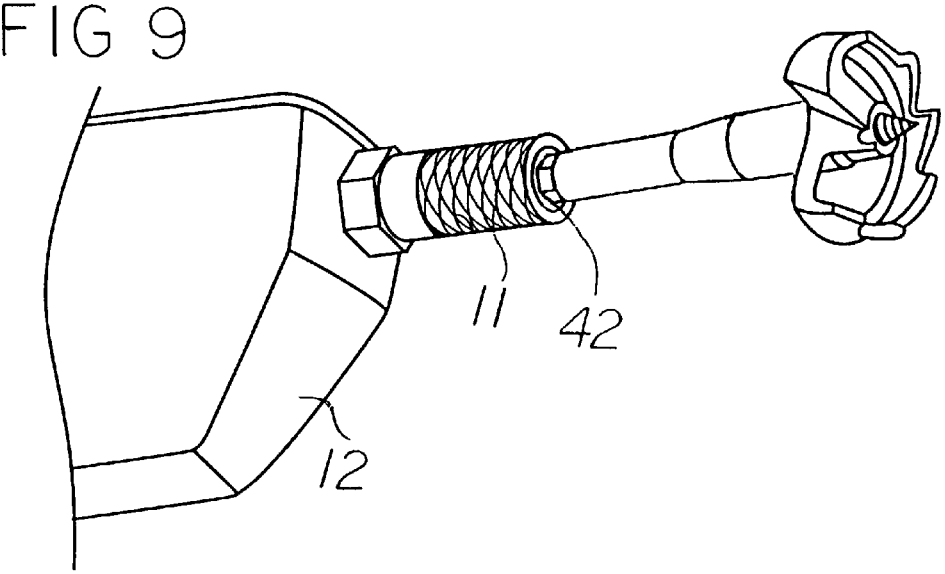
FIG. 9 is a perspective view of a drill and the quick change adapter of FIG. 8 shown filly assembled.

FIGS. 1 & 2 illustrate the quick change adapter extension being inserted in the quick change adapter. By inserting the telescoping quick change tool it allows for a long reach from between 6" to 12", or at any 1" interval. Multiple quick change adapter extensions can be coupled together for a longer reach to obtain greater depth of hole. Referring to FIG. 9, a quick change extender extension and telescoping quick change tool are shown ready for use. (Note: Typically, the quick change drill bits range in size from 1" to 2%6", for use in the plumbing, heating, and electrical fields. However, they can also be used by central vacuum installers, HVAC personnel, and the average homeowner who would like to throw away that annoying chuck key.

FIG. 17 shows an exploded view of the quick change coupler showing the various parts as listed below:
 a. Knurled retaining collar that holds the entire assembly together.
 b. Knurled spring loaded sliding collar that slides away from the retaining collar to release the locking balls which then allows for the insertion of a tool. The sliding collar is machined to a taper on the inside to allow the locking balls freedom of movement when the collar is pulled back from the original position. As the collar is held in this position, a quick change drill bit (see FIG. 25) or extension (FIG. 10) is inserted and the collar is released. The spring returns the collar to the original position, forcing the locking balls to fit into the groove (or dimples) of the tool, thereby holding it firmly in place.
 c. Left hand allen cap screw that locks the quick change coupler to the drill shaft.
 d. Sliding collar return spring.
 e. Locking balls. (Three required).
 f. Main body of the quick change coupler.

The knurled spring loaded sliding collar is arranged for sliding away from the retaining collar to release the locking balls to allow the insertion of a tool. The sliding collar is machined to a taper on the inside to allow the locking balls freedom of movement when the collar is pulled back from the original position. As the collar is held in this position, the quick change drill bit extension (see FIG. 19) can be inserted completely, or at any one of a number of positions that are desired, and the collar is released. The spring returns the collar to the original position, forcing the locking balls to fit into the groove (or dimples) of the tool, thereby holding the tool firmly in place.

What is claimed is:

1. An extender apparatus for use with a rotary drive comprising;
 a. tool means comprising a selected tool for drilling a hole extending into a work piece;
 b. drive means for rotating a selected tool;
 c. successive coupling means for quick acting coupling without key comprising;
  i) drive coupler comprising a threaded adapter means at a first end for engaging said drive means and collet means positioned at an other end including a receptor cavity formed in a polygonal shape to receive a polygonal shaft including at least one recess element;
  ii) extender coupling means comprising collet means for successively mounting extender means on the drive coupler having a tubular body having a first end and second end comprising a polygonal shaft mounted at one end having at least one recess element adapted to be received by the collet means of the threaded adapter;
  iii) tool coupler means including collet means for mounting said tool means on said extender means comprising a quick disconnect collet coupler at the second end; and
 d) a receptor cavity formed in a polygonal shape to receive a polygonal shaft for interconnecting the tool extender with a selected tool for drilling/boring deep holes.

2. The extender apparatus of claim 1 wherein the collet means comprises a cylindrical body having a journal surface including a plurality of sockets, each socket adapted to retain a ball moveable between an inner locking position and a outer release position adapted to associate with one or more recess elements provided on an associated extendible shaft member and a threaded retaining ring at the other end for retaining said sleeve in place on said body wherein said sleeve is slideably mounted on said journal surface in combination with a spring for urging the sleeve between a retracted disconnect position and a connect position.

3. The extender apparatus of claim 1 wherein the extender means comprises a tubular body having a first end and second end comprising;

i) a polygonal shaft mounted at one end having at least one recess element adapted to be received by the collet means of the threaded adapter wherein each of the balls engage a recess element for engaging the shaft for keyless longitudinal locking and the polygonal shaped shaft is locked in place longitudinally by the action of the polygonal cavity;

ii) a quick disconnect collet coupler at the second end comprising a cylindrical body having a journal surface including a plurality of sockets, each socket adapted to retain a ball moveable between an inner locking position and a outer release position adapted to associate with one or more recess elements on a polygonal shaft member;

iii) a threaded retaining ring at the other end for retaining a sleeve in place on the journal, the sleeve slideably mounted on the journal surface with a spring for moving the sleeve between a retracted disconnect portion and a connect position; and iv) a receptor cavity formed in a polygonal shape to receive a polygonal shaft for interconnecting the tool extender with a plurality of components wherein the tool means for drilling/boring deep holes comprise a polygonal shaft having at least one recess element adapted to be received by the quick disconnect collet of the tool extender wherein the balls selectively engage a recess element for engaging said polygonal shaft and the polygonal shaped shaft is locked in place by the action of the polygonal cavity of said collet.

4. The extender apparatus of claim 1 wherein the tool is a drill bit having a polygonal shaft having at least five recess elements adapted to be received by the quick disconnect collet of the tool extender wherein the balls selectively engage a recess element for engaging said polygonal shaft and the polygonal shaped shaft is locked in place by the action of the polygonal cavity of said collet.

5. The extender apparatus of claim 1 wherein the tool means comprise a bit having an extendible shaft for forming holes of increasing depth.

6. The tool extender apparatus of claim 1 wherein the extender means is adapted to associate with successively longer bits for forming holes of increasing depth.

7. The extender apparatus of claim 1 wherein the a receptor cavity formed in a hexagonal shape for interconnecting the drive coupling with a plurality of components having hexagonal shafts including at least one recess element.

8. The extender apparatus of claim 1 wherein the recess element contained on a shaft member is formed as a groove for engaging a plurality of balls for locking a tool in place.

9. The extender apparatus of claim 1 wherein the recess element contained on a shaft member is formed as a plurality of dimples for engaging a plurality of balls for locking a tool in place.

10. The extender apparatus of claim 1 wherein each component includes a polygonal shaft configured to be received by a quick disconnect collet.

* * * * *